(12) United States Patent
Nagata et al.

(10) Patent No.: US 6,676,058 B2
(45) Date of Patent: Jan. 13, 2004

(54) WEBBING RETRACTOR

(75) Inventors: Tomonori Nagata, Aichi-ken (JP);
Katsuki Asagiri, Aichi-ken (JP);
Yasuho Kitazawa, Aichi-ken (JP);
Kazuhiko Aihara, Aichi-ken (JP);
Kenji Gotou, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 10/282,218

(22) Filed: Oct. 29, 2002

(65) Prior Publication Data
US 2003/0098377 A1 May 29, 2003

(30) Foreign Application Priority Data

Nov. 2, 2001 (JP) .................................... 2001-337856

(51) Int. Cl.[7] .............................................. B60R 22/28
(52) U.S. Cl. .................................................. 242/379.1
(58) Field of Search ....................... 242/379.1; 280/805, 280/806; 297/472, 478

(56) References Cited

U.S. PATENT DOCUMENTS 6,131,843 A * 10/2000 Singer et al. ............. 242/379.1
6,216,972 B1 * 4/2001 Rohrle .................... 242/379.1

FOREIGN PATENT DOCUMENTS

JP          2001-334911         12/2001

* cited by examiner

Primary Examiner—John M. Jillions
(74) Attorney, Agent, or Firm—Nixon Peabody, LLP (57) ABSTRACT

A webbing retractor is provided. A wire for increasing force limiter load spans between a spool and a lock base. A concave groove is formed in one end portion of the wire. A push nut of a lock plate cover engages with the concave groove and the wire is fixed. One engagement piece of the push nut is longer than other engagement pieces so as to push the one end portion of the wire toward the other engagement pieces.

21 Claims, 10 Drawing Sheets

WEBBING RETRACTOR

BACKGROUND OF THE INVENTION

1. Field of the Invention

The present invention relates to a webbing retractor which, at the time a vehicle rapidly decelerates and by using a locking device, temporarily locks rotation in a webbing pull-out direction of a spool on which a webbing for restraining a vehicle occupant is taken-up in a roll form by urging force, and which, in this state, permits a predetermined amount of rotation of the spool in the webbing pull-out direction due to load of a predetermined value or more being applied from the vehicle occupant to the webbing.

2. Description of the Related Art

Generally, a three-point-type seat belt device is structured so as to include a webbing for restraining a vehicle occupant, an anchor plate, a webbing retractor, a shoulder anchor, a tongue plate, and a buckle device. The anchor plate fixes one end portion of the webbing to the floor of the vehicle. The webbing retractor is a device which is disposed at the lower end portion of the center pillar of the vehicle and which takes-up the other end portion of the webbing in a roll form by urging force. The shoulder anchor is disposed at the upper portion of the center pillar, and an intermediate portion of the webbing is movably inserted through the shoulder anchor. An intermediate portion of the webbing passes through the tongue plate. The buckle device stands upright at the side of a seat of the vehicle, and the tongue plate engages therewith.

Various types of the above-described webbing retractor have been proposed. In one type, when the vehicle rapidly decelerates, the webbing retractor temporarily stops rotation of the spool in the webbing pull-out direction. Thereafter, due to a load of a predetermined value or more being applied to the webbing from the vehicle occupant, a torsion bar, which is provided integrally with and coaxially with the axially central portion of the spool, is twisted. The spool is thereby rotated by a predetermined amount in the webbing pull-out direction. In this way, the load which the vehicle occupant receives from the webbing which is in a locked state can be lessened. This mechanism is called a "force limiter mechanism".

Recently, structures have been proposed in which the load, at the time when the spool can rotate again by a predetermined amount in the webbing pull-out direction due to an increase in the webbing tensile force after the rotation of the spool in the webbing pull-out direction has been stopped at the time when the vehicle rapidly decelerates (this load is the force limiter load and hereinafter will be abbreviated as "FL load"), is set to be two stages. Namely, in the initial stage of rapid deceleration of the vehicle, the FL load is maintained high, and the energy absorption efficiency is high. Thereafter, by reducing the FL load, the load which the vehicle occupant receives from the webbing is reduced. There are several concrete means for realizing such operation. One is a method in which a wire is made to span between the spool and the locking device in advance. The wire is usually held in an installed state. When the force limiter mechanism operates, the wire, whose base end portion is fixed to a push nut formed at the locking device, is pulled out from the spool while being strongly rubbed, and the wire is thereby made to bear the additional amount of the FL load.

However, if the above-described structure in which the wire is strongly rubbed is utilized, the following problems arise. Employment of this structure is based on the premise that the base end portion of the wire is reliably fixed to the locking device. In conventional techniques in which the base end portion of the wire is press-fit into the push nut, it is difficult to ensure a strongly fixed state. Moreover, when rattling arises in a case in which the base end portion of the wire is fixed to the push nut, noise may be generated.

SUMMARY OF THE INVENTION

In view of the aforementioned, an object of the present invention is to provide a webbing retractor which can reliably fix the base end portion of an elongated resistance imparting member to a locking device, and which can prevent the generation of noise.

An aspect of the present invention is a webbing retractor comprising a spool taking up a webbing, for restraining a vehicle occupant, in a roll form by urging force; an energy absorbing member connected coaxially to the spool; a locking device stopping rotation of the energy absorbing member in a webbing pull-out direction, at a time of rapid deceleration of a vehicle; a resistance imparting member whose one end portion is fixed to the locking device and another portion of which is anchored at the spool; and a push nut formed at a portion of the locking device. The energy absorbing member usually rotates integrally with the spool. In a state in which rotation of the energy absorbing member in the webbing pull-out direction is impeded, the energy absorbing member deforms due to load of a predetermined value or more being applied to the energy absorbing member via the spool, and permits a predetermined amount of rotation of the spool in the webbing pull-out direction. The resistance imparting member has a concave groove in an outer peripheral surface of the one end portion. The resistance imparting member usually rotates integrally with the spool without imparting rotational resistance to the spool. After locking by the locking device, in an initial stage of a state in which the spool rotates in the webbing pull-out direction, the resistance imparting member imparts resistance to the rotation of the spool in the webbing pull-out direction, and thereafter, separates from the spool and cancels the state of imparting resistance. The push nut has a plurality of engagement pieces. A length of one or more the engagement pieces is substantially longer than a length of the other engagement pieces. When the push nut is pressed-in, the plurality of engagement pieces substantially deform and engage with the concave groove of the resistance imparting member.

In accordance with the present invention, the energy absorbing member, which is coaxially connected to the spool, usually rotates integrally with the spool in the webbing pull-out direction and the webbing take-up direction.

When the vehicle rapidly decelerates, rotation of the energy absorbing member in the webbing pull-out direction is stopped by the locking device. In this way, the rotation of the spool in the webbing pull-out direction also is temporarily stopped. However, inertial force toward the front of the vehicle is applied to the vehicle occupant. Accordingly, because load in the pulling-out direction is applied to the webbing from the vehicle occupant, when this load reaches a predetermined value or more, the energy absorbing member deforms and the spool is rotated by a predetermined amount in the webbing pull-out direction. As a result, the load applied from the webbing to the vehicle occupant is reduced.

In the present invention, the one end portion of the elongated resistance imparting member is connected to the locking device, and the other end portion is anchored at the spool. Therefore, the resistance imparting member usually rotates integrally with the spool without imparting rotational resistance to the spool. When the vehicle rapidly decelerates, in the initial period of the stage in which the rotation of the energy absorbing member in the webbing pull-out direction is locked by the locking device, the resistance imparting member imparts resistance to the rotation of the spool in the webbing pull-out direction. Accordingly, in the initial stage of rapid deceleration of the vehicle, energy is absorbed at an FL load, in which are added together both an FL load due to deformation of the energy absorbing member and an FL load due to the rotational resistance which the resistance imparting member imparts to the spool. Thereafter, because the resistance imparting member separates from the spool, the state in which the resistance imparting member imparts resistance to the spool is cancelled. Thus, after the initial stage of the rapid deceleration of the vehicle, energy is absorbed at the FL load due to the deformation of the energy absorbing member. In this way, in accordance with the present invention, the FL load is set to be two stages. At the initial stage of the rapid deceleration of the vehicle, the energy absorption amount is large, and the amount by which the webbing is pulled out (the amount of movement of the vehicle occupant toward the front of the vehicle) is suppressed. Thereafter, the energy absorption amount is decreased and the load applied to the vehicle occupant is lessened.

Moreover, in accordance with the present invention, the concave groove is provided in the outer peripheral surface of the one end portion of the resistance imparting member, and the push nut is provided at the locking device. The push nut is formed from a plurality of engagement pieces which, due to the operation of pressing-in the one end portion of the resistance imparting member, deform and engage with the concave groove. Therefore, the one end portion of the resistance imparting member can be reliably fixed at the locking device.

In addition, in accordance with the present invention, the length of one or more of the engagement pieces is longer than the length of the other engagement pieces. Therefore, the one end portion of the resistance imparting member can be reliably pushed toward the other engagement pieces by the one or more engagement pieces. Accordingly, it is possible to prevent rattling between the one end portion of the resistance imparting member and the push nut of the locking device.

DESCRIPTION OF THE PREFERRED EMBODIMENTS

A webbing retractor 10 relating to a first embodiment of the present invention will be described hereinafter on the basis of FIGS. 1 through 10.

Figure 1:
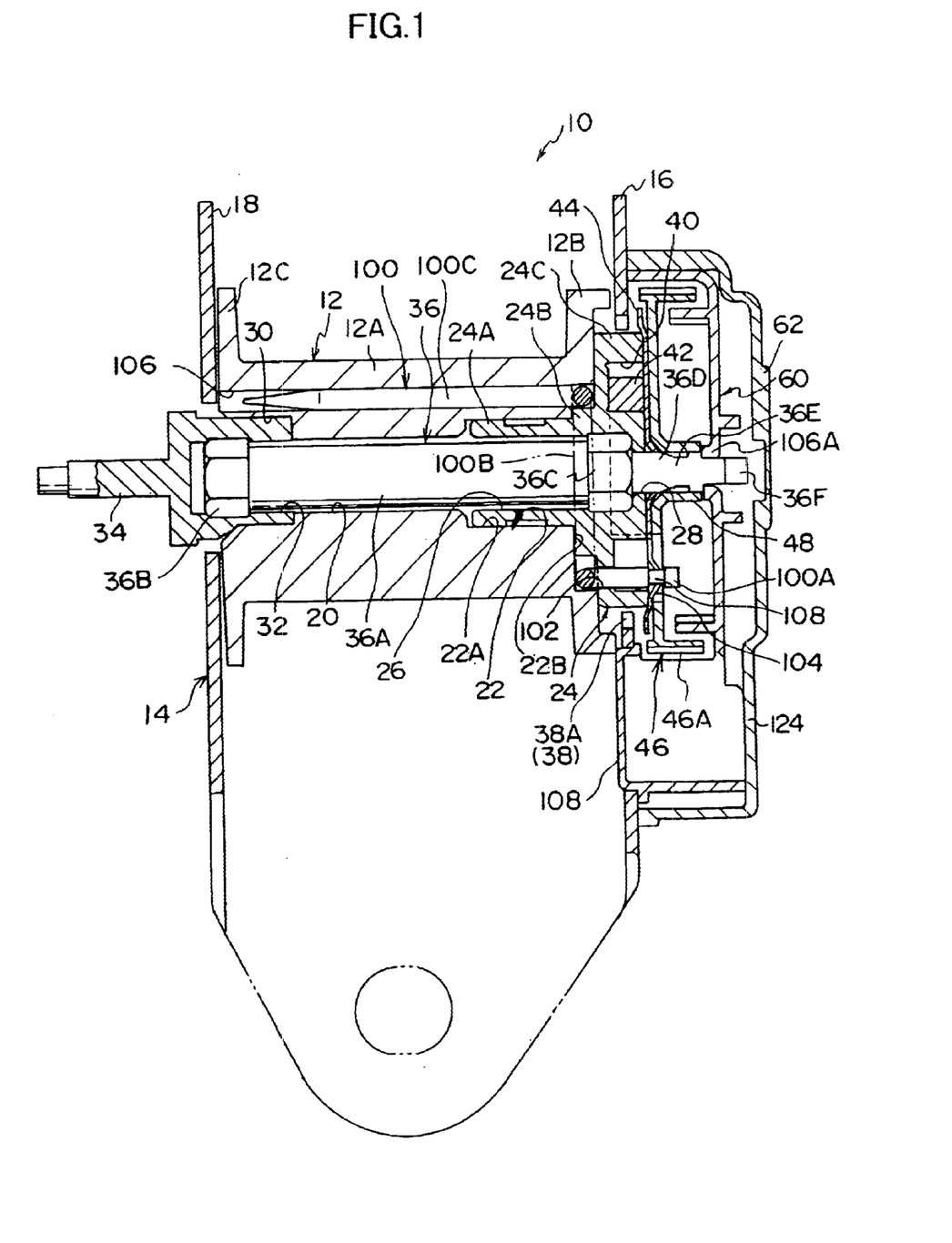
FIG. 1 is a longitudinal sectional view showing the overall structure of a webbing retractor relating to an embodiment of the present invention.

The overall structure of the webbing retractor 10 relating to the present embodiment is shown in sectional view in FIG. 1. As is shown in FIG. 1, the webbing retractor 10 has a frame 14 which is substantially U-shaped as seen in plan view. The frame 14 is fixed to a vehicle body. The frame 14 has a first leg plate 16 and a second leg plate 18 which extend parallel to one another. A spool 12, which is formed by die casting, is rotatably supported between the first leg plate 16 and the second leg plate 18.

The spool 12 is formed by a spool shaft 12A which is shaped as a hollow cylinder and forms an axially central portion, and a pair of flange portions which are formed in substantial disc shapes at the both end portions of the spool shaft 12A. (Hereinafter, the flange portion which is disposed at the first leg plate 16 side will be called a "first flange portion 12B", and the flange portion which is disposed at the second leg plate 18 side will be called a "second flange portion 12C".) The spool 12 is formed on the whole in a drum-like shape. One end of a webbing 100 is anchored on the spool shaft 12A of the spool 12. Due to the spool 12 rotating, the webbing 100 can be freely taken-up and pulled-out with respect to the spool 12.

A shaft through hole 20 is formed in the axially central portion of the spool shaft 12A. A lock base receiving portion 22, which is formed as a recess portion and whose diameter is greater than that of the shaft through hole 20, is formed coaxially at the first flange portion 12B side at the shaft through hole 20. The lock base receiving portion 22 is formed by a recess portion main body 22A which takes up the majority of the lock base receiving portion 22, and a recess portion final end portion 22B whose diameter is greater than that of the recess portion main body 22A. A lock base 24 is mounted in the lock base receiving portion 22 so as to be unable to be removed therefrom. As the method for mounting the lock base 24, a method is employed in which, after the lock base 24 is inserted into the lock base receiving portion 22, a stopper (removal preventing member), which is not illustrated and which is formed in a substantial U-shape as seen in front view, is press-fit in from a direction orthogonal to the axis of the spool shaft 12A. Although the lock base 24 is manufactured by die casting in the present embodiment, the lock base 24 does not necessarily have to be manufactured by die casting. As will become clear from the operation and effects which will be described later, it suffices for the lock base 24 to be formed of a material which can engage with ratchet teeth 38A due to plastic deformation at the time when the lock base 24 is pressed into contact with the ratchet teeth 38A at the time when the vehicle rapidly decelerates.

The lock base 24 is formed in the shape of a hollow cylinder having a collar, and is formed by a base portion 24A, an intermediate portion 24B, and a holding portion 24C. The base portion 24A is fit in the hollow portion main body 22A of the lock base receiving portion 22. The intermediate portion 24B has a larger diameter than that of the base portion 24A, and is fit into the recess portion final end portion 22B of the lock base receiving portion 22. The holding portion 24C has a larger diameter than that of the intermediate portion 24B, and is disposed in a state of abutting the outer side surface of the first flange portion 12B. A hexagonal hole shaped fitting hole 26 is formed in the lock base 24 at a portion thereof other than the axially central portion outer end. Further, a small hole 28, which communicates with the axially central portion of the fitting hole 26 and whose diameter is smaller than that of the fitting hole 26, is formed in the axially central portion outer end of the lock base 24.

A sleeve receiving portion 30, which is formed in the shape of a recess portion and whose diameter is larger than that of the shaft through hole 20, is formed in the second flange portion 12C side of the shaft through hole 20 of the spool shaft 12A. A female spline is formed in the inner peripheral portion of the sleeve receiving portion 30. A sleeve 34, at whose outer peripheral portion a male spline is formed and in whose axially central portion a hexagonal hole shaped fitting hole 32 is formed, is fit into the sleeve receiving portion 30. The inner end of an urging device (a power spring, which urges and rotates the spool 12 in the webbing take-up rotating direction, is anchored via an adapter (not shown) to the distal end portion of the sleeve 34. The sleeve 34 which has the above-described structure is one of the structural parts of a pretensioner which instantaneously rotates the spool 12 in the webbing take-up rotating direction when the vehicle rapidly decelerates.

The lock base 24 and the sleeve 34 are connected together by a torsion bar 36 as an energy-absorbing member. The torsion bar 36 is formed by a shaft portion 36A which forms the main portion of the torsion bar 36; a head portion 36B which is hexagonal and is formed at one end portion of the shaft portion 36A; a fitting portion 36C which is hexagonal and is formed at the other end portion of the shaft portion 36A; a small diameter portion 36D which extends from the axially central portion of the fitting portion 36C so as to be coaxial with the shaft portion 36A; a gear holding portion 36E whose diameter becomes narrow along a taper surface from the small diameter portion 36D, and thereafter, the diameter thereof increases in an annular shape; and a distal end portion 36F which extends coaxially from the gear holding portion 36E and at which a key is formed.

The head portion 36B of the torsion bar 36 is fit into the hexagonal hole shaped fitting hole 32 formed in the sleeve 34. The fitting portion 36C of the torsion bar 36 is fit into the hexagonal hole shaped fitting hole 26 formed in the lock base 24. In this way, the torsion bar 36 is integral with the spool shaft 12A via the lock base 24 and the sleeve 34.

Note that the torsion bar 36 which has the above-described structure is a main structural part of the force limiter mechanism and absorbs energy by torsionally deforming due to webbing tension of a predetermined value or more being applied to the spool 12 when the vehicle rapidly decelerates.

Figure 2:
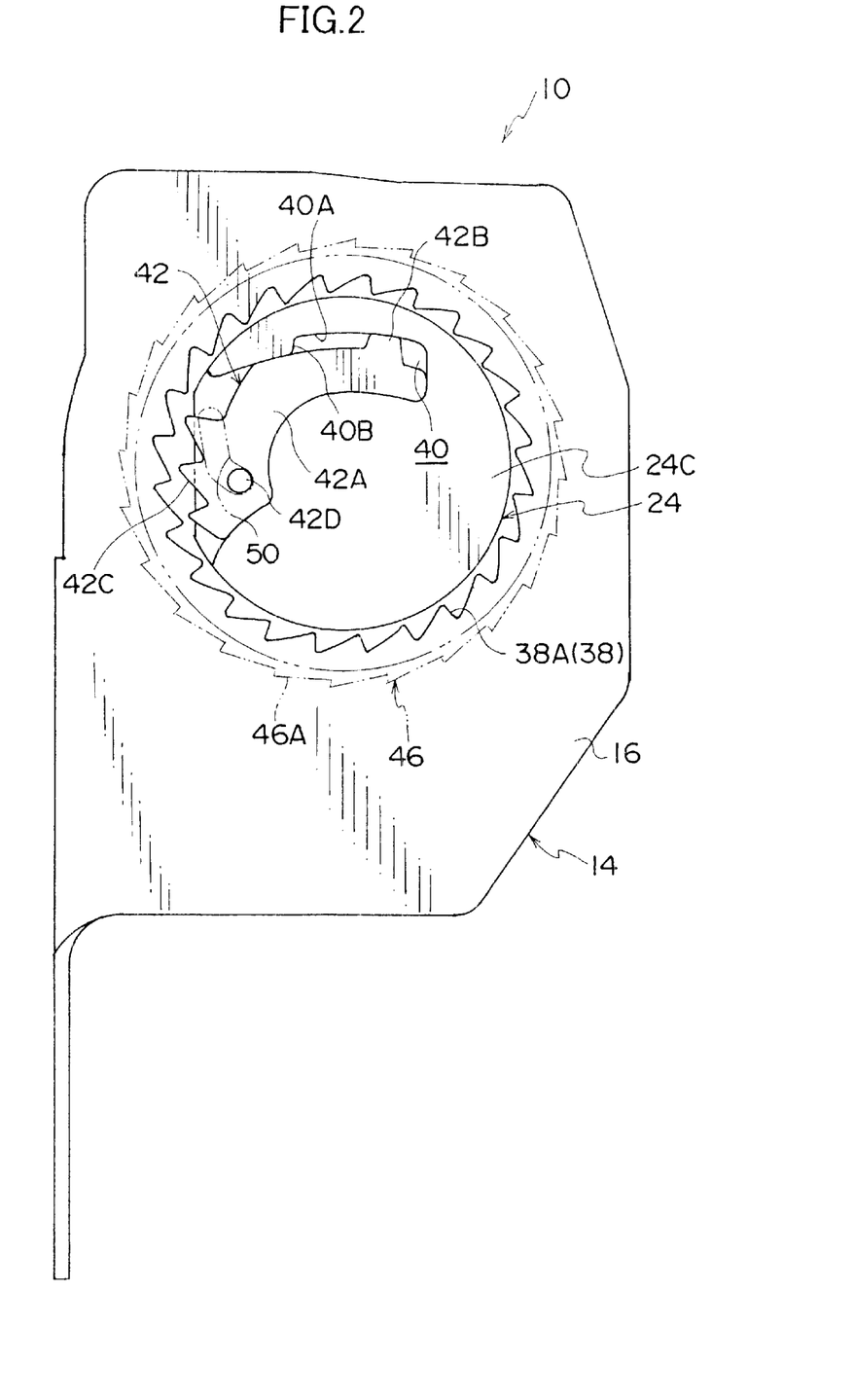
FIG. 2 is a schematic side view showing an unlocked state of the webbing retractor relating to the embodiment.
Figure 3:
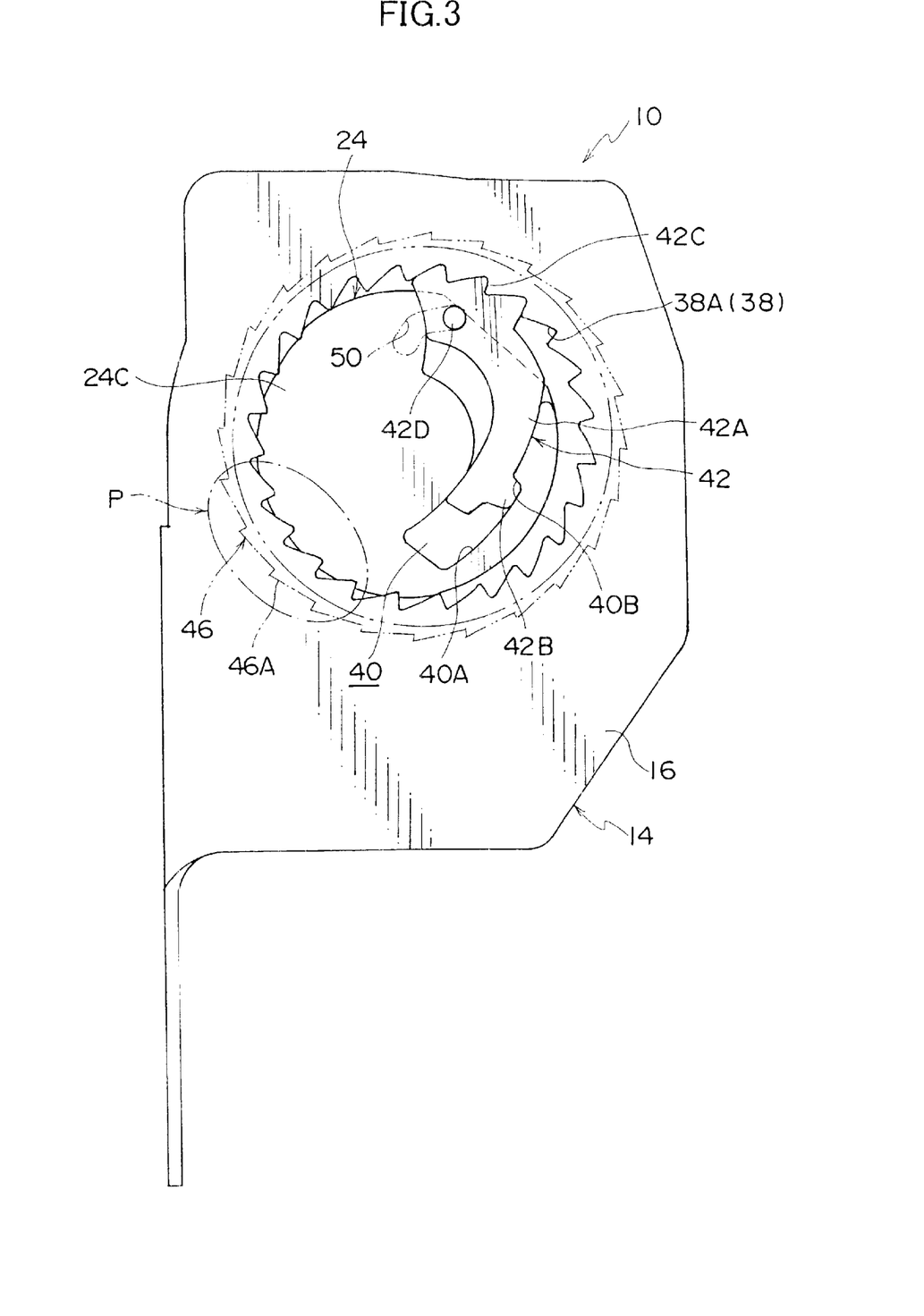
FIG. 3 is a schematic side view showing a locked state of the webbing retractor relating to the embodiment.

As shown in FIGS. 2 and 3, an internal ratchet 38 is formed by punching in the upper portion side of the first leg plate 16 of the frame 14. Ratchet teeth 38 of the internal ratchet 38 are set to have high strength.

The holding portion 24C of the lock base 24 is disposed at the radial direction inner side of the internal ratchet 38. The small diameter portion 36D of the torsion bar 36 is inserted in the small hole 28 formed in the axially central portion of the holding portion 24C. A concave accommodating portion 40, which is formed in the peripheral direction around the small hole 28, is formed at the outer surface side of the holding portion 24C. One end portion of the accommodating portion 40 is closed, and the other end portion of the accommodating portion 40 is open. The other end portion side of the accommodating portion 40 of the holding portion 24C of the lock base 24 is chamfered so that an engaging movement of a lock plate 42, which will be described next, with the internal ratchet 38 is not impeded. The lock plate 42, which is formed in a substantially circular arc plate shape, is accommodated within the accommodating portion 40. Further, a thin disc-shaped lock cover 44 for preventing the lock plate 42 from falling off, is mounted in a state in which rotation thereof is prevented, at the outer side surface at the holding portion 24C of the lock base 24.

The lock plate 42 is formed by a plate main body 42A which is formed of metal and is formed in a substantial circular arc plate shape; a projecting portion 42B which is rectangular and juts out from one end portion of the plate main body 42A; high-strength lock teeth 42C which are formed at the outer peripheral portion of the other end portion of the plate main body 42A, and mesh with ratchet teeth 38A of the internal ratchet 38 of the first leg plate 16; and a guide pin 42D which is formed to stand at this other end portion of the plate main body 42A. Note that a length which is the sum of the width of the plate main body 42A and the projecting length of the projecting portion 42B is substantially equal to the width of a wide portion 40A of the accommodating portion 40 of the lock base 24.

A substantially disc-shaped V gear 46, whose diameter is larger than that of the lock base 24, is disposed at a position adjacent to the lock base 24. A solid cylindrical boss 48 is formed at the axially central portion of the V gear 46. The boss 48 is shaft-supported so as to be able to rotate to follow rotation of the gear holding portion 36E of the torsion bar 36. Further, a guide hole 50, which is substantially formed in the shape of a widely-opened letter "V", is formed in the V gear 46. The guide pin 42D which is formed to stand at the lock plate 42 is inserted into the guide hole 50. Moreover, lock teeth 46A are formed integrally at the outer peripheral portion of the V gear 46.

Figure 4:
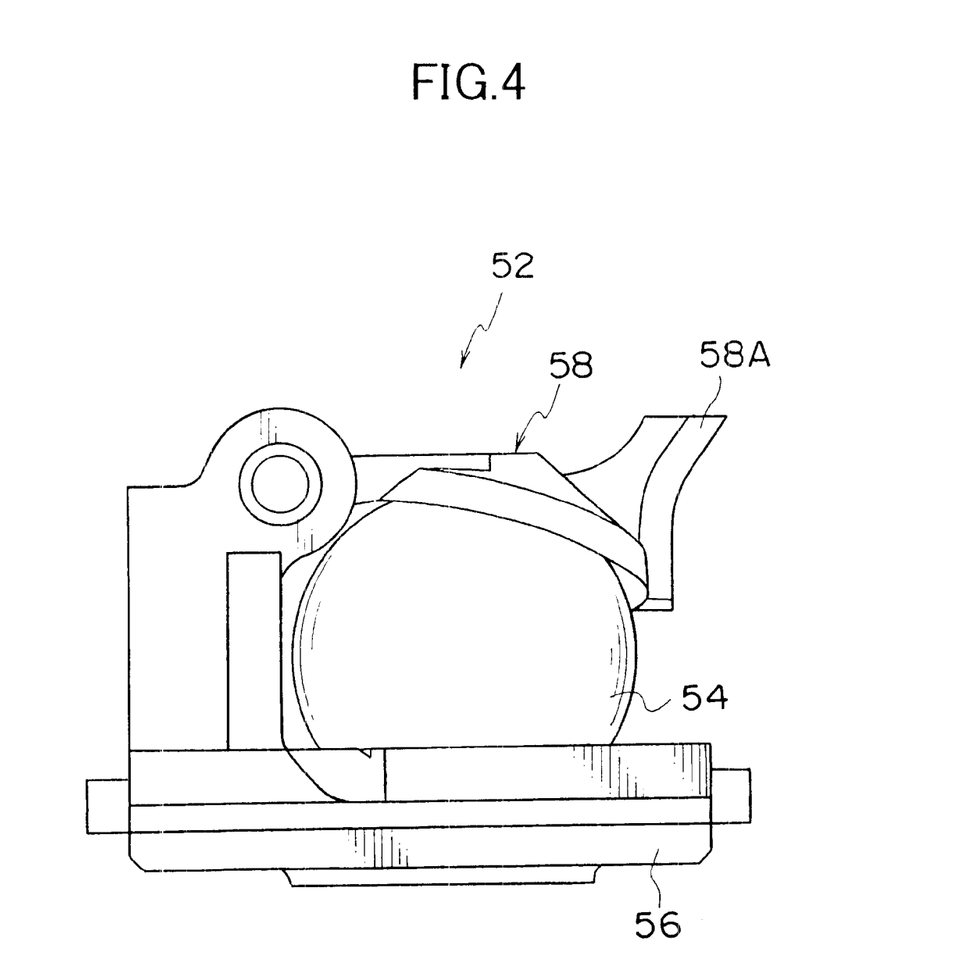
FIG. 4 is a side view of an acceleration sensor which is not shown in FIG. 1.

An acceleration sensor 52 for VSIR (vehicle sensitive inertia reel) which is shown in FIG. 4 is disposed beneath the V gear 46. Note that the acceleration sensor 52 is not illustrated in FIGS. 1 through 3. At the time of rapid deceleration of the vehicle, a ball 54 of the acceleration sensor 52 rolls on a sensor housing 56 and swings a sensor lever 58, and a lock claw 58A of the sensor lever 58 engages with the lock tooth 46A of the V gear 46.

The acceleration sensor 52 is held by a sensor holder 60 made of resin. A sensor cover 62, which is made of resin and has a shape which resembles that of the sensor holder 60, is disposed at the outer side of the sensor holder 60. The sensor holder 60 and the sensor cover 62 are made integral and fixed to the first leg plate 16 of the frame 14. A boss 60A, which is tubular and is short, is formed integrally with the axially central portion of the sensor holder 60. The boss 60A is shaft-supported at a distal end portion 36F of the torsion bar 36. Namely, the sensor holder 60 functions as a bearing of the torsion bar 36. Inner teeth, which can engage with a pawl for a WSIR which is not illustrated and is shaft-supported at the V gear 46, are formed integrally at the inner peripheral portion of the sensor holder 60.

In the above-described structure, the lock base 24, the internal ratchet 38, the lock plate 42, the lock plate cover 44, the V gear 46, the acceleration sensor 52, the sensor holder 60 and the sensor cover 62 correspond to the "locking device" of the present invention.

Structure Relating to Two-Stage FL Structure

As shown in FIG. 1, a wire 100, which serves as a "resistance imparting member" formed of an extremely hard material, spans between the spool shaft 12A of the spool 12 and the lock base 24. To describe the wire 100 more concretely with reference to FIGS. 6A and 6B, the wire 100 is formed by one end portion 100A which is relatively short; an intermediate portion 100B which is bent at a right angle from the one end portion 100A and curves in a circular arc shape; and a main body portion 100C which is relatively long, and is bent from the distal end portion of the intermediate portion 100B, and extends substantially parallel to the one end portion 100A in the direction opposite to the direction in which the one end portion 100A extends. Note that the distal end portion of the main body portion 100C is formed in a substantial taper shape.

Figure 7:
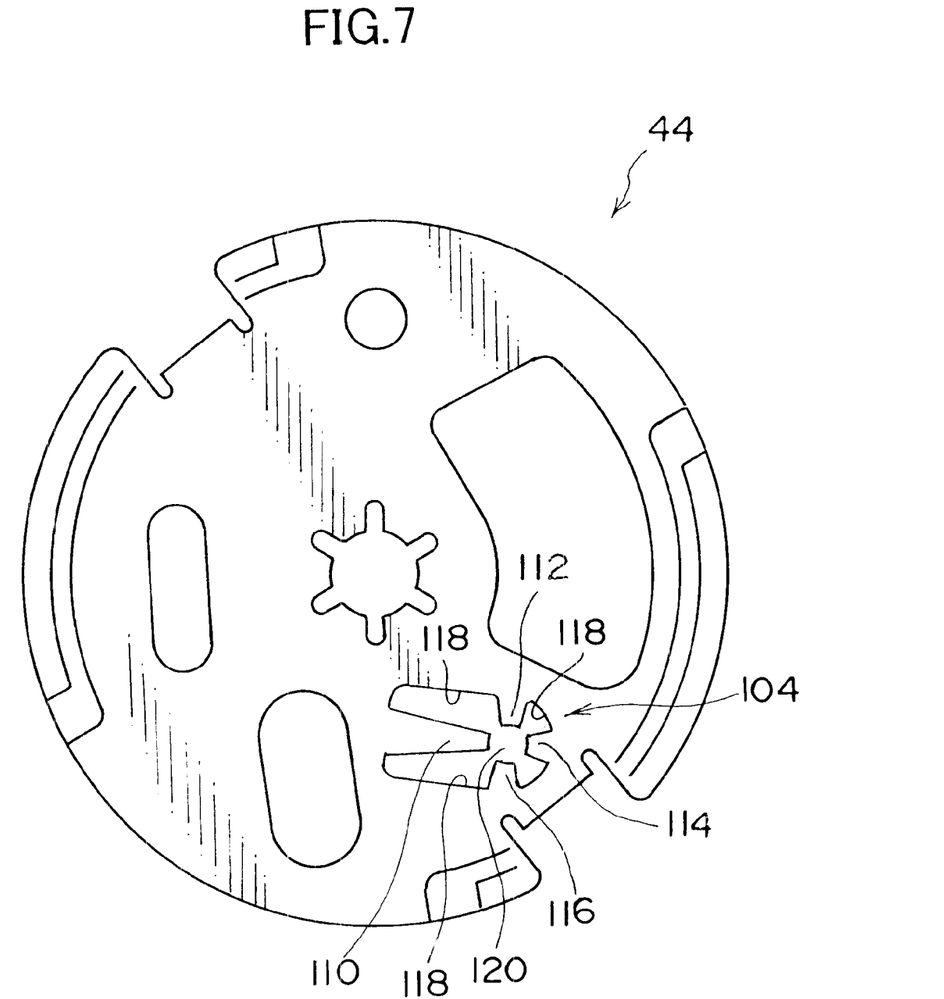
FIG. 7 is a front view showing a lock plate cover at which a push nut is formed.
Figure 8:
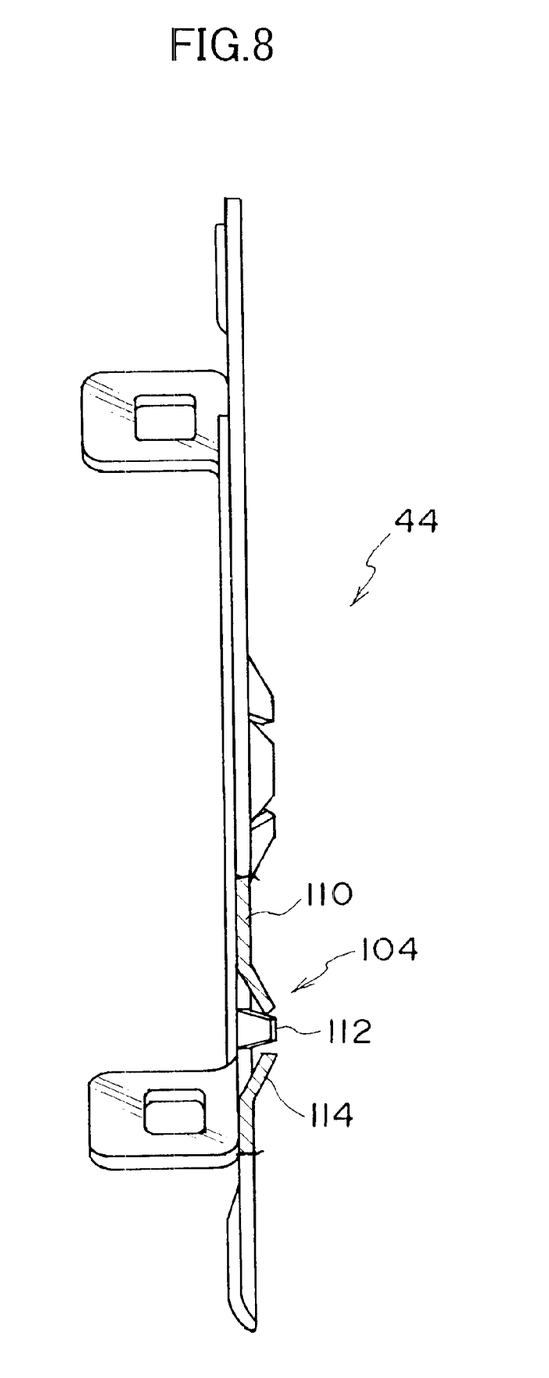
FIG. 8 is a side view of the lock plate cover showing a state in which the push nut is broken.
Figure 9:
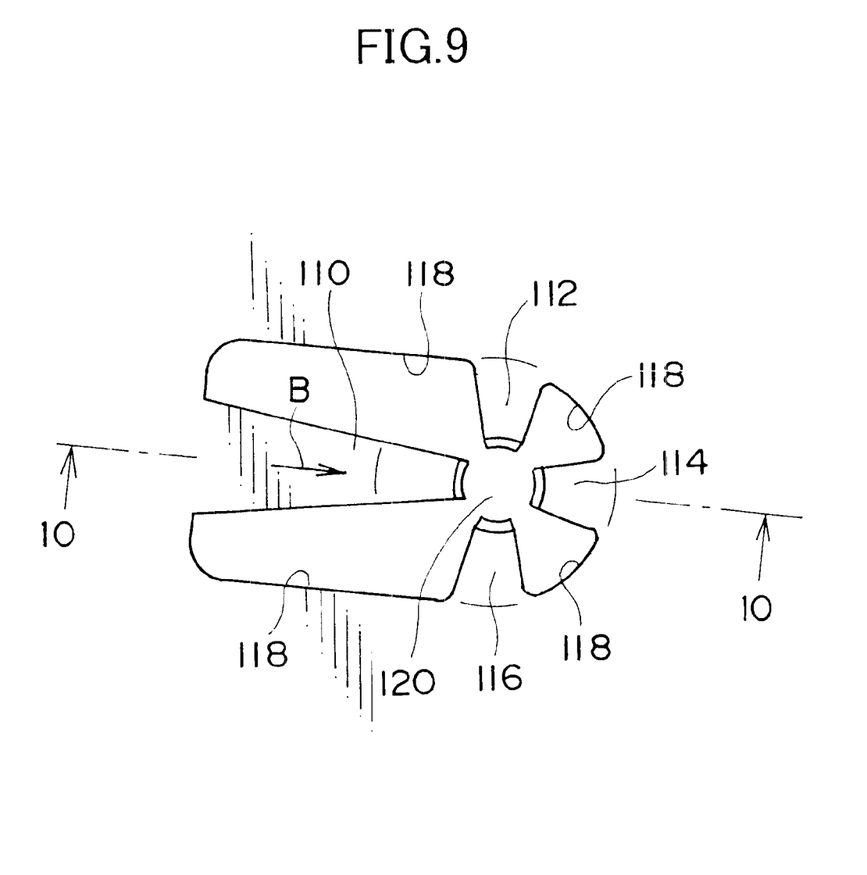
FIG. 9 is an enlarged view of the push nut formed at the lock plate cover.
Figure 10:
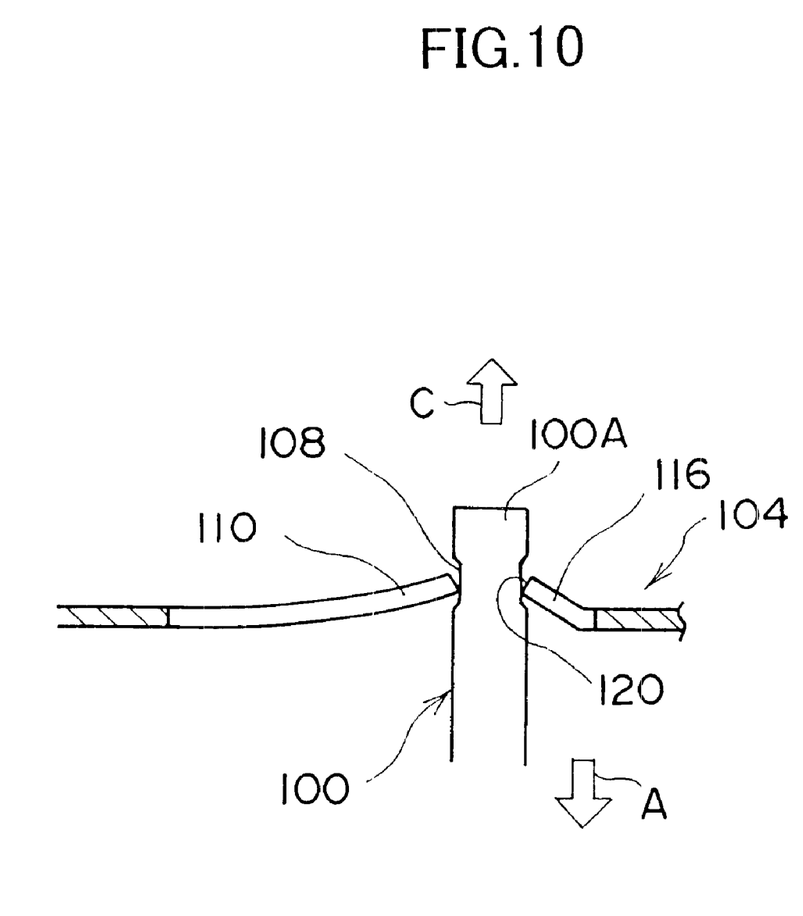
FIG. 10 is a sectional view, taken along line 10—10 of FIG. 9, showing a state in which one end portion of the wire is fixed to the push nut formed at the lock plate cover.

As shown in FIG. 1, a wire insert-through hole 102, which passes through in the direction of the plate thickness of the bottom wall portion of the holding portion 24C of the lock base 24, is formed in the bottom wall portion of the holding portion 24C of the lock base 24, so as to correspond to the structure of the wire 100. Moreover, as shown in FIG. 7, a push nut 104, which is for fixing the one end portion 100A of the wire 100, is formed integrally at a predetermined position of the lock plate cover 44 which is assembled to the lock base 24. A wire insert-through hole 106 is formed in the spool shaft 12A parallel to the axis thereof. The wire insert-through 102 at the lock base 24 and the wire insert-through hole 106 at the spool shaft 12A are positioned so as to be parallel to one another.

As will be described later, the wire 100 having the above-described structure spans between the spool shaft 12A and the lock base 24. In the state in which the lock plate cover 44 is attached to the lock base 24, after the one end portion 100A of the wire 100 is inserted into the wire insert-through hole 102 of the lock base 24, the one end portion 100A of the wire 100 is fixed to the lock base 24 by the one end portion 100A being press-fit into the push a nut 104 of the lockplate cover 44. Further, in this state, when the lock base 24 is attached to the spool shaft 12A, the main body portion 100C of the wire 100 is inserted into and anchored at the interior of the wire insert-through hole 106 of the spool shaft 12A.

Structure of Main Portions of Present Embodiment

Figure 6A:
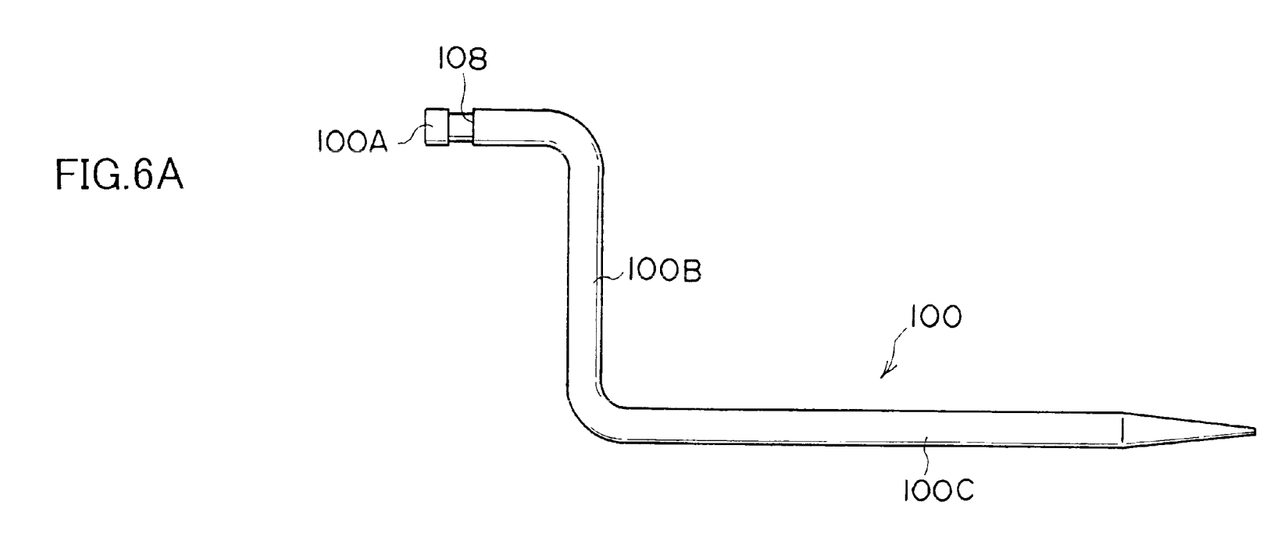
FIG. 6A is a plan view of a wire shown in FIG. 1.
Figure 6B:
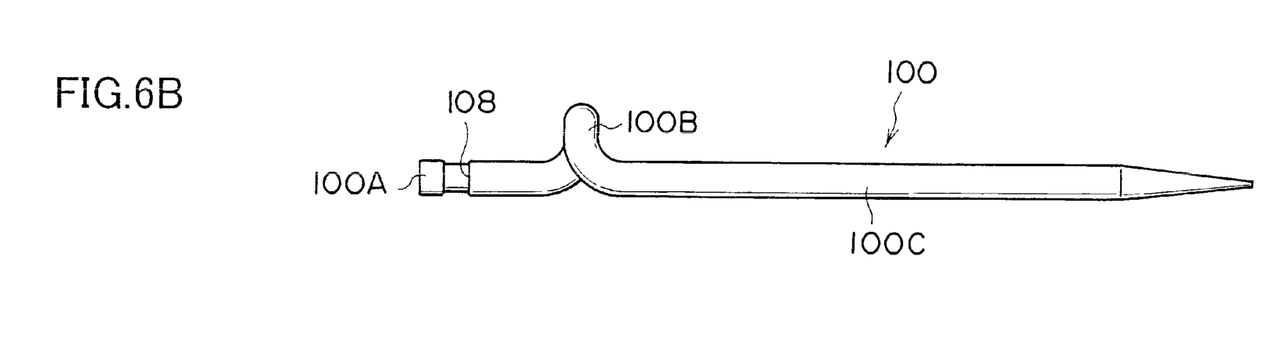
FIG. 6B is a side view of the wire of FIG. 1.

As shown in FIGS. 6A and 6B, a concave groove 108 is formed in the outer peripheral surface of the one end portion 100A of the wire 100 along the entire periphery thereof. This concave groove 108 is one of the main structures of the present embodiment.

As described above, the push nut 104 is formed at the lock plate cover 44. More specifically, as shown in FIGS. 7 through 10, the push nut 104 is formed by a plurality of engaging pieces 110 through 116. In the present embodiment, there are four engagement pieces for example. Each of the first engagement piece 110 through the fourth engagement piece 116 is formed in the shape of a tongue plate. Openings 118 formed by punching are formed between adjacent ones of the first engagement piece 110 through the fourth engagement piece 116. Moreover, each of the first engagement piece 110 through the fourth engagement piece 116 are bent at a predetermined angle toward the V gear 48 side. A wire insertion hole 120, for insertion of the one end portion 100A of the wire 100, is formed at the central portion of the push nut 104.

In the present embodiment, the length of one or more of the engagement pieces of the push nut 104 is longer than the lengths of other engagement pieces. More specifically, this one or more of the engagement pieces is the first engagement piece 110, and the other engagement pieces are the second engagement piece 112 through the fourth engagement piece 116. This point is another main structure of the present embodiment.

Next, operation and effects of the present embodiment will be described.

A vehicle occupant holds a tongue plate (not shown), through which the webbing 100 passes, and pulls the webbing 100 out from the spool 12 against the urging force of a power spring, and engages the tongue plate with a buckle device (not shown). In this way, the vehicle occupant is in a state in which the webbing 100 of a three-point-type seatbelt device is applied to him/her. Namely, the portion of the webbing 100 from a shoulder anchor (not shown), which is provided at an upper portion of a center pillar, to the tongue plate is the shoulder side webbing 100. The portion of the webbing 100 from the tongue plate to the buckle device is the lap side webbing 100.

During normal driving, the torsion bar 36 rotates together with the spool 12 in an either direction for pulling or retracting the webbing. From this state of normal driving, when, while the vehicle is traveling, the vehicle rapidly decelerates, a pretensioner (not shown) is operated, and the spool 12 is instantaneously made to rotate in the webbing take-up direction via the sleeve 34. Simultaneously, the locking device stops the torsion bar 36 from rotating in the direction for pulling the webbing.

Briefly explaining the operation of the locking device, the state of a rapid deceleration of the vehicle is detected by the acceleration sensor 52. Namely, the ball 54 of the acceleration sensor 52 rolls on the sensor housing 56 and swings the sensor lever 58. In this way, the lock claw 58A of the sensor lever 58 engages with the lock tooth 46A of the V gear 46, and rotation of the V gear 46 in the direction of arrow A is impeded.

Then, the spool 12 is about to rotate in the direction for pulling the webbing by responding to the webbing tension acted by the occupant who is inertially moving toward the vehicle front. Thus, relative rotation arises between the spool 12, which is attempting to rotate, and the V gear 46, whose rotation in the direction of arrow A is impeded. When relative rotation arises between these two as understandable from FIGS. 2 and 3, the guide pin 42D of the lock plate 42 which is held in the accommodating portion 40 formed in the holding portion 24C of the lock base 24 is guided within the guide hole 50 of the V gear 46. The guide pin 42S is moved substantially toward the radial direction outer side of the lock base 24. In this way, the lock tooth 42C of the lock plate 42 meshes with the ratchet tooth 38A of the internal ratchet 38 which is provided at the first leg plate 16 of the frame 14, and rotation of the lock base 24 in the direction of arrow A is impeded.

When the lock teeth 42C of the lock plate 42 mesh with the ratchet teeth 38A of the internal ratchet 38, the reaction force at this time is applied to the holding portion 24C of the lock base 24. This reaction force is quite large because it is generated due to the ratchet teeth 38A and the lock teeth 42C which are very strong meshing together at the time when the vehicle rapidly decelerates. Therefore, the reaction force is of course also applied to the torsion bar 36 which passes through the axially central portion of the lock base 24. Moreover, because the distal end portion 36F of the torsion bar 36 is shaft-supported at the boss 60A of the sensor holder 60 which is formed of resin, the reaction force is applied to the boss 60A of the sensor holder 60 from the distal end portion 36F of the torsion bar 36, and the boss 60A of the sensor holder 60 is elastically deformed in the direction of working of the reaction force, i.e., in the direction toward the side opposite the position of engagement of the lock plate 42. Therefore, one portion of the outer periphery of the holding portion 24C of the lock base 24 (the range whose center is the portion denoted by arrow P in FIG. 3) is strongly pushed against the ratchet teeth 38A of the internal ratchet 38 of the frame 14. Because the lock base 24 is formed by die casting, it is relatively soft. Therefore, when the lock base 24 press-contacts the ratchet teeth 38A, the lock base 24 plastically deforms, the ratchet teeth 38A bite into the lock base 24, and the lock base 24 is directly engaged with the ratchet teeth 38A. Due to the above processes, a state (locked state) arises in which the lock plate 42 and the lock base 24 mesh with the internal ratchet 38 of the first leg plate 16 at two places which oppose one another in the radial direction, and rotation of the torsion bar 36 in the webbing pull-out direction is impeded.

When rotation of the torsion bar 36 in the webbing pullout direction is stopped as described above, the rotation, in the webbing pull-out direction, of the spool 12 which is integral with the torsion bar 36 is also temporarily stopped. However, inertial force toward the front of the vehicle acts on the vehicle occupant, and load is applied from the vehicle occupant to the webbing in the direction of pulling-out. Therefore, when this load reaches a predetermined value or more, torsional deformation arises at the torsion bar 36, and the spool 12 rotates a predetermined amount in the webbing pull-out direction. As a result, the load applied to the vehicle occupant from the webbing is lessened.

Figure 5:
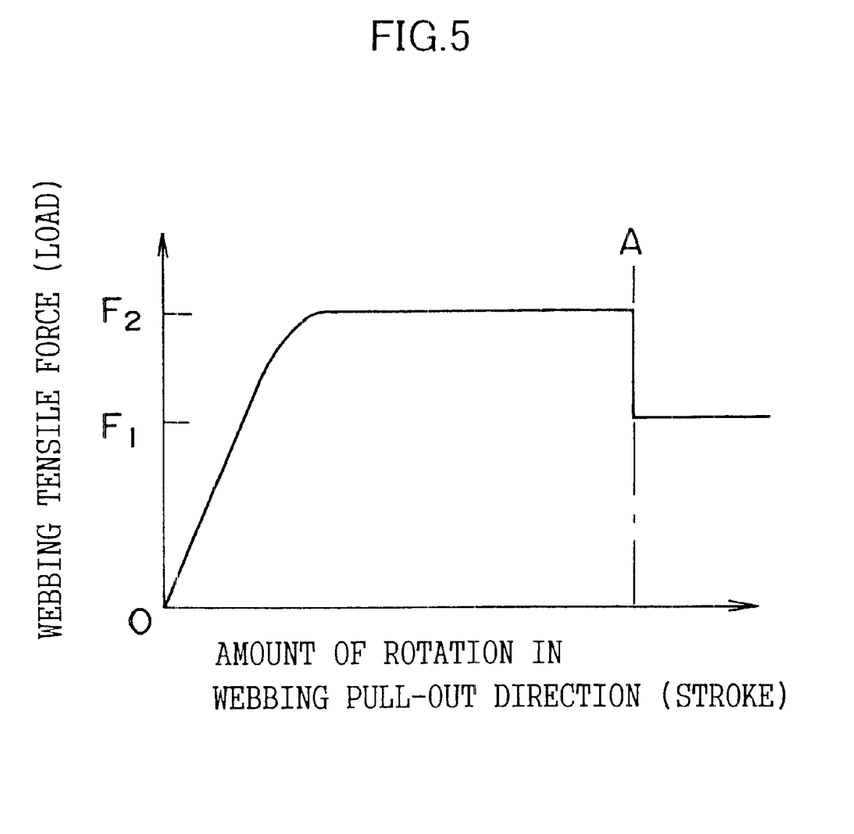
FIG. 5 is a graph showing a two-stage FL load characteristic of the webbing retractor relating to the embodiment.

Here, in the present embodiment, the one end portion 100A of the wire 100 is connected to the lock plate cover 44 which forms one portion of the locking device, and the main body portion 100C of the wire 100 is inserted and anchored in the wire insert-through hole 106 of the spool shaft 12A. Therefore, usually, the wire 100 does not impart rotational resistance to the spool 12, and rotates integrally with the spool 12. At the time of a rapid deceleration of the vehicle, in the initial period of the stage when the torsion bar 36 twists in the webbing pull-out direction and the spool 12 rotates in the webbing pull-out direction, the wire 100 imparts resistance to the rotation of the spool 12 in the webbing pull-out direction. More specifically, when the torsion bar 36 twists and the spool 12 rotates relative to the lock base 24, the main body portion 100C of the wire 100, as the spool 12 rotates, is pulled out from the wire insert-through hole 106 of the spool 12, and is taken-up onto the outer peripheral surface of the intermediate portion 24B of the lock base 24. In this process, the wire 100 is strongly rubbed. Accordingly, as shown in FIG. 5, in the initial stage of rapid deceleration of the vehicle, energy absorption is carried out at Force-Limitor (FL) load F2 in which the FL load F1, which is due to the deformation of the torsion bar 36, and the FL load, which is due to the rotational resistance which the wire 100 imparts to the spool 12, are added together. Thereafter, the wire 100 comes out from the wire insert-through hole 106 of the spool shaft 12A. Therefore, the state in which resistance is being imparted to the spool 12 by the wire 100 is cancelled. As a result, after the initial stage of the rapid deceleration of the vehicle, energy absorption is carried out at the FL load F1 which is due to the torsional deformation of the torsion bar 36. In this way, in accordance with the webbing retractor 10 relating to the present embodiment, the FL load is set in two stages. In the initial stage of the rapid deceleration of the vehicle, the energy absorption amount is large and the amount of pulling-out of the webbing (the amount of movement of the vehicle occupant toward the front of the vehicle) can be suppressed, and thereafter, the energy absorption amount is reduced and the load applied to the vehicle occupant can be lessened.

The above has been a description of the overall operation and effects of the webbing retractor 10 relating to the present embodiment. The webbing retractor 10 relating to the present embodiment also has the following peculiar operation and effects.

First, in the webbing retractor 10 relating to the present embodiment, the concave groove 108 is provided in the outer peripheral surface of the one end portion 100A of the wire 100. Further, the push nut 104, which is formed from a plurality of engagement pieces (the first engagement piece 110 through the fourth engagement piece 116) which deform and engage with the concave groove 108 due to the press-in operation of the one end portion 100A of the wire 100, is provided at the lock plate cover 44. Therefore, the one end portion 100 of the wire 100 can reliably be fixed to the lock plate cover 44.

To explain this point in more detail, if the concave groove 108 were not provided at the outer peripheral surface of the one end portion 100A of the wire 100 and the one end portion 100A were to have a flat peripheral surface, because the wire 100 is extremely hard, the push nut 104 would not be effective when the FL load was F2. Accordingly, there would be the possibility that the wire 100 would be pulled out from the wire insert-through hole 102 of the lock base 24. However, if the concave groove 108 is provided at the outer peripheral surface of the one end portion 100A of the wire 100 and the first engagement piece 110 through the fourth engagement piece 116 are made to engage with the concave groove 108 as in the present embodiment, the holding force of the one end portion 100A of the wire 100 can be increased. Accordingly, the wire 100 can be reliably prevented from being pulled out in the direction of application of load (the direction of arrow A in FIG. 10) at the time when the force limiter mechanism operates.

Second, in the webbing retractor 10 relating to the present embodiment, the length of the first engagement piece 110 is longer than the lengths of the second engagement piece 112 through the fourth engagement piece 116. When the one end portion 100A of the wire 100 is press-fit into the wire insertion hole 120 of the push nut 104, the second engagement piece 112 through the fourth engagement piece 116 plastically deform and engage with the concave groove 108. The first engagement piece 110 does not plastically deform, and engages with the concave groove 108 in a state in which the first engagement piece 110 is, on the whole, flexed (elastically deformed). In this way, the one end portion 100A of the wire 100 can be pushed toward the second engagement piece 112 through the fourth engagement piece 116 (in the direction of arrow B in FIG. 9). Accordingly, it is possible to prevent rattling between the one end portion 100A of the wire 100 and the push nut 104 of the lock plate cover 44. As a result, it is possible to prevent noise from being generated between the one end portion 100A of the wire 100 and the first engagement piece 110 through the fourth engagement piece 116 of the push nut 104 when the vehicle is travelling normally.

In addition to the above-described unique effects, the webbing retractor 10 relating to the present embodiment also has effects such as the following.

One other effect is that the one end portion 100A of the wire 100 can be fixed to the lock plate cover 44 by the one end portion 100A of the wire 100 being inserted through the wire insert-through hole 102 of the lock base 24 and, in that state, being press-fit into the wire insertion hole 120 of the push nut 104 of the lock plate cover 44. As a result, the direction of assembly is a single direction (the direction of arrow IV in FIG. 10). The assembly workability of the wire 100 can thereby be improved.

Another effect is that a structure is employed in which the concave groove 108 is formed integrally in the outer peripheral surface of the one end portion 100A of the wire 100, and the push nut 104 is formed integrally with the lock plate cover 44, and the one end portion 100A of the wire 100 is press-fit into the push nut 104 and fixed. As a result, there is no need for other parts, and this structure does not lead to an increase in parts. It is possible to simplify the structure and to lower costs.

In the present embodiment, the present invention is applied to the webbing retractor 10 which is equipped with both a pretensioner and a force limiter. However, the present invention is not limited to the same, and may be applied to a webbing retractor of a type which is not equipped with a pretensioner.

Moreover, in the present embodiment, a locking structure, in which the single lock plate 42 is used as a trigger, is employed as the locking device. However, the present invention is not limited to the same, and any of various locking devices can be employed. It suffices to utilize a locking device equipped with a member at which the push nut 104, which is for fixing the one end portion 100A of the wire 100, can be formed. What type of locking mechanism is to be used is an arbitrary matter of design.

In the present embodiment, the wire 100 is utilized as the elongated resistance imparting member. However, it is not absolutely necessary to utilize the wire 100. The resistance imparting member may of course be modified or improved.

Further, the present embodiment utilizes the push nut 104 which is formed from the four engagement pieces which are the first engagement piece 110 through the fourth engagement piece 116. However, the present invention is not limited to the same. There may be three engagement pieces, or there may be five or more engagement pieces. It suffices to utilize plural engagement pieces. Moreover, each engagement piece may have a different configuration. What is important is that one or more of the engagement pieces is longer than the other engagement pieces, and that rattling can be eliminated by this one or more of the engagement pieces pushing the one end portion of the resistance imparting member toward the other engagement pieces. This point is to be interpreted as a necessary and sufficient condition. Accordingly, for example, in a case in which a push nut formed from eight engagement pieces is used, a structure can be utilized in which adjacent two or three engagement pieces are longer than the remaining six or five engagement pieces. Moreover, a structure may be utilized in which a single one engagement piece is longer than the remaining seven engagement pieces. Namely, "one or more engagement pieces" covers both a single engagement piece and plural engagement pieces.

As explained above, of the webbing retractor of the present invention, the resistance imparting member has one end portion is fixed to the locking device and another portion anchored at the spool. The push nut is formed at a portion of the locking device. The resistance imparting member includes a concave groove in an outer peripheral surface of the one end portion. The resistance imparting member usually rotates integrally with the spool without imparting rotational resistance to the spool. After locking by the locking device, in an initial stage of a state in which the spool rotates in the webbing pull-out direction, the resistance imparting member imparts resistance to the rotation of the spool in the webbing pull-out direction, and thereafter, separates from the spool and cancels the state of imparting resistance. The push nut includes a plurality of engagement pieces. A length of one or more the engagement pieces is substantially longer than a length of the other engagement pieces. When the push nut is pressed-in, the plurality of engagement pieces substantially deform and engage with the concave groove of the resistance imparting member. Therefore, the base end portion of the resistance imparting member can be reliably fixed at the locking device, and it is possible to prevent noise generation between the base end portion of the resistance imparting member and the push nut of the locking device.

What is claimed is:

1. A webbing retractor comprising:

a spool taking up a webbing, for restraining a vehicle occupant, in a roll form by urging force;

an energy absorbing member connected coaxially to the spool and usually rotating integrally with the spool, and in a state in which rotation of the energy absorbing member in a webbing pull-out direction is impeded, the energy absorbing member deforms due to load of a predetermined value or more being applied to the energy absorbing member via the spool, and permits a predetermined amount of rotation of the spool in the webbing pull-out direction;

a locking device which stops rotation of the energy absorbing member in the webbing pull-out direction, at a time of rapid deceleration of a vehicle;

a resistance imparting member whose one end portion is fixed to the locking device and another portion of which is anchored at the spool, and the resistance imparting member comprises a concave groove in an outer peripheral surface of the one end portion, and the resistance imparting member usually rotates integrally with the spool without imparting rotational resistance to the spool, and after locking by the locking device, in an initial stage in which the spool rotates in the webbing pull-out direction, the resistance imparting member imparts resistance to rotation of the spool in the webbing pull-out direction, and thereafter, separates from the spool and cancels a state of imparting resistance; and a push nut provided at a portion of the locking device and comprising a plurality of engagement pieces, and a length of one or more the engagement pieces is substantially longer than a length of other engagement pieces, and due to an operation of pressing-in the push nut, the plurality of engagement pieces substantially deform and engage with the concave groove of the resistance imparting member.

2. The webbing retractor of claim 1, wherein the resistance imparting member includes a wire, and the wire comprises the one end portion which is relatively short, and an intermediate portion which is bent substantially at a right angle from the one end portion, and a main body portion which is bent from a distal end of the intermediate portion and which extends substantially parallel to the one end portion.

3. The webbing retractor of claim 1, wherein the locking device includes a lock base, and the lock base has a portion through which the resistance imparting member can be inserted, and when the resistance imparting member is inserted through said portion of the lock base, the push nut is pressed-in and the one end portion of the resistance imparting member is fixed to the lock base.

4. The webbing retractor of claim 1, wherein said portion of the locking device is a lock plate cover, and the push nut is formed at the lock plate.

5. The webbing retractor of claim 2, wherein the main body portion of the wire includes a substantially tapered distal end.

6. The webbing retractor of claim 2, wherein the main body portion of the wire includes said other portion which is anchored at the spool.

7. The webbing retractor of claim 3, wherein the resistance imparting member includes a wire, and the wire comprises the one end portion which is relatively short, and an intermediate portion which is bent substantially at a right angle from the one end portion, and a main body portion which is bent from a distal end of the intermediate portion and which extends substantially parallel to the one end portion.

8. The webbing retractor of claim 3, wherein the energy absorbing member includes a torsion bar, and the lock base and the spool are connected to one another.

9. The webbing retractor of claim 4, wherein the resistance imparting member includes a wire, and the wire comprises the one end portion which is relatively short, and an intermediate portion which is bent substantially at a right angle from the one end portion, and a main body portion which is bent from a distal end of the intermediate portion and which extends substantially parallel to the one end portion.

10. The webbing retractor of claim 7, wherein the push nut comprises four engagement pieces and openings positioned between adjacent engagement pieces, and each engagement piece is substantially tongue-shaped and bent at a given angle, and said portion through which the wire can be inserted is positioned at a substantial center surrounded by distal ends of the engagement pieces which are bent.

11. The webbing retractor of claim 7, wherein the push nut comprises three engagement pieces and openings positioned between adjacent engagement pieces, and each engagement piece is substantially tongue-shaped and bent at a given angle, and said portion through which the wire can be inserted is positioned at a substantial center surrounded by distal ends of the engagement pieces which are bent.

12. The webbing retractor of claim 7, wherein the push nut comprises five engagement pieces and openings positioned between adjacent engagement pieces, and each engagement piece is substantially tongue-shaped and bent at a given angle, and said portion through which the wire can be inserted is positioned at a substantial center surrounded by distal ends of the engagement pieces which are bent.

13. The webbing retractor of claim 7, wherein the push nut comprises eight engagement pieces and openings positioned between adjacent engagement pieces, and each engagement piece is substantially tongue-shaped and bent at a given angle, and said portion through which the wire can be inserted is positioned at a substantial center surrounded by distal ends of the engagement pieces which are bent, and two adjacent engagement pieces are substantially longer than remaining six engagement pieces.

14. The webbing retractor of claim 7, wherein the push nut has eight engagement pieces and openings positioned between adjacent engagement pieces, and each engagement piece is substantially tongue-shaped and bent at a given angle, and said portion through which the wire can be inserted is positioned at a substantial center surrounded by distal ends of the engagement pieces which are bent, and three adjacent engagement pieces are substantially longer than remaining five engagement pieces.

15. The webbing retractor of claim 7, wherein the push nut has eight engagement pieces and openings positioned between adjacent engagement pieces, and each engagement piece is substantially tongue-shaped and bent at a given angle, and said portion through which the wire can be inserted is positioned at a substantial center surrounded by distal ends of the engagement pieces which are bent, and one engagement piece is substantially longer than remaining seven engagement pieces.

16. The webbing retractor of claim 9, wherein the push nut comprises four engagement pieces and openings positioned between adjacent engagement pieces, and each engagement piece is substantially tongue-shaped and bent at a given angle, and said portion through which the wire can be inserted is positioned at a substantial center surrounded by distal ends of the engagement pieces which are bent.

17. The webbing retractor of claim 9, wherein the push nut comprises three engagement pieces and openings positioned between adjacent engagement pieces, and each engagement piece is substantially tongue-shaped and bent at a given angle, and said portion through which the wire can be inserted is positioned at a substantial center surrounded by distal ends of the engagement pieces which are bent.

18. The webbing retractor of claim 9, wherein the push nut comprises five engagement pieces and openings positioned between adjacent engagement pieces, and each engagement piece is substantially tongue-shaped and bent at a given angle, and said portion through which the wire can be inserted is positioned at a substantial center surrounded by distal ends of the engagement pieces which are bent.

19. The webbing retractor of claim 9, wherein the push nut comprises eight engagement pieces and openings positioned between adjacent engagement pieces, and each engagement piece is substantially tongue-shaped and bent at a given angle, and said portion through which the wire can be inserted is positioned at a substantial center surrounded by distal ends of the engagement pieces which are bent, and two adjacent engagement pieces are substantially longer than remaining six engagement pieces.

20. The webbing retractor of claim 9, wherein the push nut has eight engagement pieces and openings positioned between adjacent engagement pieces, and each engagement piece is substantially tongue-shaped and bent at a given angle, and said portion through which the wire can be inserted is positioned at a substantial center surrounded by distal ends of the engagement pieces which are bent, and three adjacent engagement pieces are substantially longer than remaining five engagement pieces.

21. The webbing retractor of claim 9, wherein the push nut has eight engagement pieces and openings positioned between adjacent engagement pieces, and each engagement piece is substantially tongue-shaped and bent at a given angle, and said portion through which the wire can be inserted is positioned at a substantial center surrounded by distal ends of the engagement pieces which are bent, and one engagement piece is substantially longer than remaining seven engagement pieces.

* * * * *